March 24, 1936.　　F. J. LYDEN　　2,034,950
ELECTRIC MOTOR
Filed Aug. 30, 1933　　2 Sheets-Sheet 1

INVENTOR
Frank J. Lyden
BY
Arthur R. Woolfolk
ATTORNEY

March 24, 1936.    F. J. LYDEN    2,034,950
ELECTRIC MOTOR
Filed Aug. 30, 1933    2 Sheets-Sheet 2

INVENTOR
Frank J. Lyden
BY
ATTORNEY

Patented Mar. 24, 1936

2,034,950

UNITED STATES PATENT OFFICE 2,034,950

ELECTRIC MOTOR

Frank J. Lyden, Dayton, Ohio

Application August 30, 1933, Serial No. 687,444

8 Claims. (Cl. 172—233)

This invention relates to electric motors of the induction type and is particularly directed to single-phase condenser type motors.

In single-phase induction motors of the split-phase type difficulty has been experienced due to the fact that an ordinary single-phase motor as generally constructed has a low starting torque which is usually produced by some special means. Some split-phase motors have a condenser connected in one of the phases, the other phase being connected directly across the mains. It has been found that if the condenser is large enough for starting, it is too large for running conditions and thus inefficiency results.

This invention is designed to overcome the above noted defects, and objects of this invention are to provide a novel form of induction motor which is wholly automatic in its operation, which is so made that the requisite condenser effect is produced at starting and a lesser effect automatically produced during the running condition of the motor so that a high efficiency is obtained for the motor.

Further objects are to provide a condenser type split-phase motor in which a very high starting torque is obtained, such starting torque, however, being obtained without any sacrifice in the efficiency under steady running conditions.

Further objects are to provide a split-phase condenser type motor in which the starting torque for a given condenser capacity is a maximum, and in which more turns may be used in the auxiliary phase during starting and less turns during running, in certain forms of this invention, thereby securing a quieter operating motor under running conditions than if the relatively larger number of turns had been permanently used under all conditions in the second or condenser phase of the motor.

Further objects are to provide a condenser type motor in which a high starting torque is secured by raising the voltage on the condenser at starting, in certain forms of the invention, in which the condenser capacity is cut down from that used at starting to get the best running or operating characteristics, and in which the condensers may be connected in parallel at starting and in series in running, the condensers having different capacities so that the series connection gives a total capacity less than that of the smallest condenser of the series, thereby requiring only one high voltage condenser of a relatively small capacity.

Further objects are to provide a novel form of condenser motor in which the effective condenser capacity from no load to the breakdown point of the motor is secured by a reactance in parallel with the condenser or condensers, in certain forms of this invention, and in which a quieter operating motor at all speeds is secured, together with better performance and higher overload capacity.

Embodiments of the invention are shown in the accompanying drawings, in which.

Figure 1:
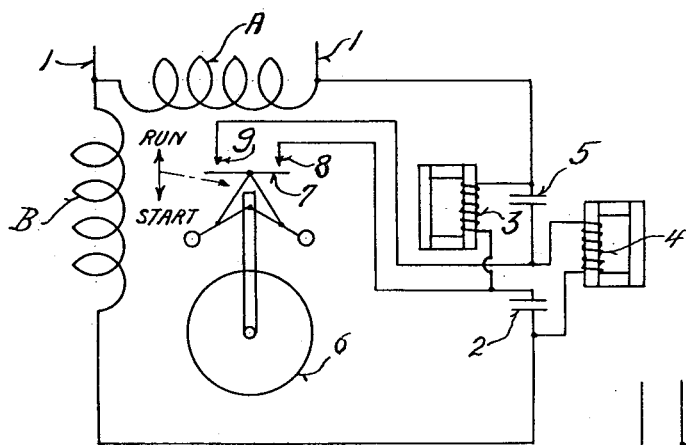
Figure 1 is a diagrammatic view showing one form that the invention may take.

Referring to Figure 1, it will be seen that an induction type split-phase motor has been illustrated as provided with a main phase A and an auxiliary phase B. The main phase is connected directly across the lines 1 and the auxiliary phase B is connected during starting across the mains but through a condenser 2, a reactance or choke coil 3, and in a parallel circuit through a reactance or choke coil 4 and a condenser 5. In other words, two parallel circuits, each made up jointly of a choke coil and condenser, are connected in series with the auxiliary phase during starting.

An automatic switch, which may take the form of a governor type of device driven from the shaft of the armature 6, is employed for altering the connection after the motor has come up to speed. This automatic switch comprises a movable contact 7 which during starting conditions is out of contact with the stationary contacts 8 and 9. However, when the motor comes up to speed, the movable contact 7 bridges the contacts 8 and 9.

It will be seen from Figure 1 that when the contacts 8 and 9 are bridged, or in other words, when this automatic switch is closed, that the condensers 2 and 5 are in effective series. Each condenser is bridged or paralleled by a choke coil. For example, the condenser 2 is bridged by the choke coil 4 and the condenser 5 is bridged by the choke coil 3.

It will be seen, therefore, that all of the advantages obtained by my prior invention as disclosed in my Patent No. 1,908,522 of May 9, 1933, for an electric motor are obtained, and in addition to this, a change in the arrangement of condensers and chokes is automatically obtained by the automatic switch so that two different types of characteristics are secured, one at starting and one at running while maintaining all of the prior advantages for this type of motor.

The condensers 2 and 5 may be of the same capacity, as an example for instance 75 microfarads, which at starting would give a joint capacity of 150 microfarads, whereas in running the effective capacity would be 37.5 microfarads.

On the other hand, the condensers may be of unequal value. For example, one condenser may be 50 microfarads and the other condenser, 100 microfarads, giving a capacity at starting of 150 microfarads, and for running, an effective capacity of 33.3 microfarads; or one condenser may be 25 microfarads and the other, 125 microfarads, which at starting give a joint capacity of 150 microfarads, whereas in running give an effective capacity of 20.8 microfarads. Again, one condenser may be 10 microfarads, and the other condenser may be 140 microfarads, which at starting gives a joint capacity of 150 microfarads, whereas for running give an effective capacity of 9.35 microfarads.

It will thus be seen that any combination of condensers may be employed, depending upon the particular effects desired. In addition to this, the chokes may be differently designed. For example, the choke 3 may be designed primarily for starting to raise the voltage on the condenser 2, or the reactor 4 may be used for this purpose to increase the voltage on the condenser 5 at starting, or one reactor may be used to decrease the condenser current, if such is desired, or, in fact, any other relation may be obtained as is needed for this type of motor for the particular conditions under which the motor is to operate.

Figure 2:
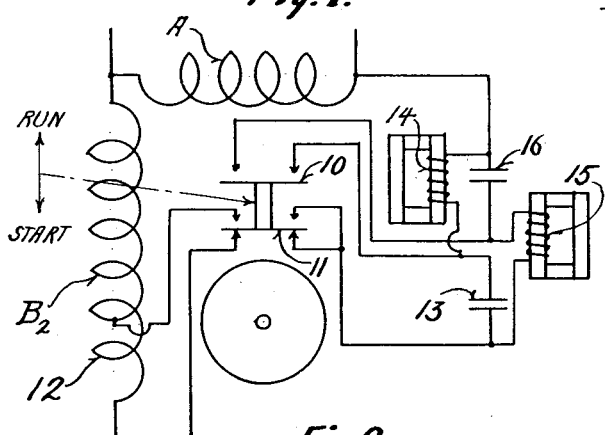
Figure 2 is a diagrammatic view showng a further form of the invention in which additional turns on the auxiliary phase are employed at starting.

In Figure 2 a further form is shown in which the main phase is the same but the auxiliary phase $B_2$ has a greater number of turns at starting than at running. It may have the same number of turns as the main phase at running to thereby secure a quieter operating motor, as is well known.

In this form of the invention the automatic switch may be operated as previously described and may comprise two movable members 10 and 11. The starting position is as shown in Figure 2 and the running position is as indicated in such figure. In the starting position the additional turns 12 of the auxiliary phase are in use and are connected to the two then parallel circuits. One of these circuits includes the condenser 13, the choke 14 in series. The other includes the choke 15 and the condenser 16 in series. It will be seen that the effect of this is to increase the voltage impressed on the condensers over and above that produced by the form shown in Figure 1. When the motor comes up to speed, the automatic switch cuts out the auxiliary turns 12 and connects the auxiliary phase to the condensers and chokes in exactly the same manner as that previously described for Figure 1, that is to say, the condensers 13 and 16 are then in series under running conditions and are respectively bridged by the chokes 15 and 14.

It is apparent that a greater number of turns in the auxiliary phase of a condenser motor than in the main phase results in a saving of condenser capacity for a given size of motor. A greater number of turns in the auxiliary phase, however, will increase the condenser voltage when the motor runs idle and also when it runs at full load.

This invention, therefore, proposes to start the condenser motor with the greater number of turns in the auxiliary phase, thereby getting the benefit of the high number of turns and the reduced condenser capacity. However, a motor built in this manner does not run as quietly as one in which the number of turns in the auxiliary phase is the same as that in the main phase.

This defect, however, is overcome by the automatic switching arrangement hereinbefore described, so that the same number of turns are employed in the auxiliary phase as in the main phase during the running condition. The exact equality need not necessarily be maintained but somewhere near equality is unquestionably preferable.

Figure 3:
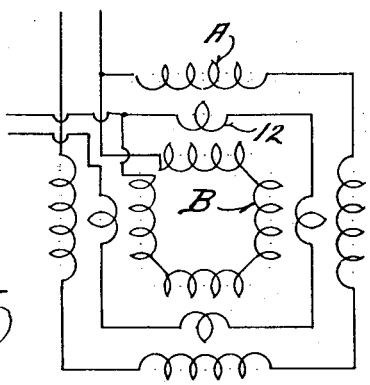
Figure 3 is a diagrammatic view showing the manner in which the winding of the auxiliary phase is positioned.

It is to be noted at this point that the additional turns in the auxiliary phase may be any number of turns and are not necessarily a multiple of the number of poles. These additional turns may be distributed in any manner desired so long as they are put with the turns of the same instantaneous polarity. It is preferable, however, to distribute these turns, for example, as shown in Figure 3. It will be noted from such figure that the auxiliary turns are distributed so that a portion is associated with the corresponding portion of each of the windings for the phase B.

Figure 4:
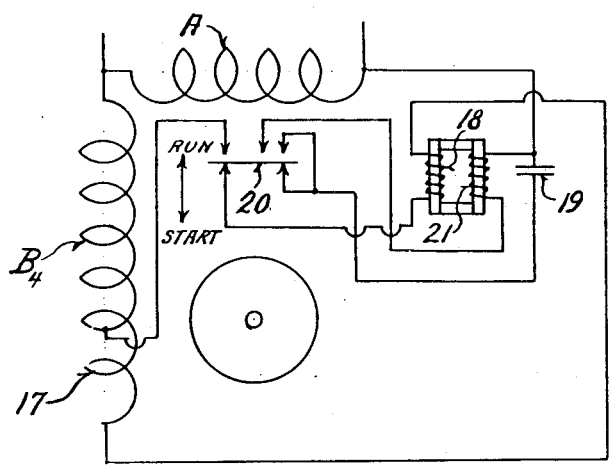
Figure 4 is a diagrammatic view of a still further form of the invention.
Figure 5:
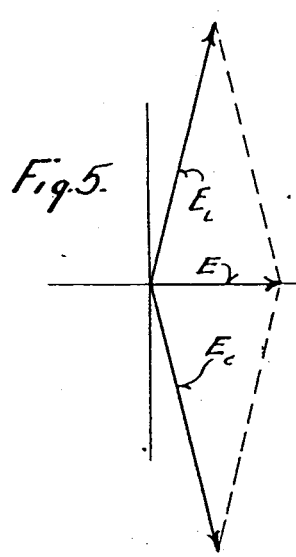
Figure 5 is a diagram of the vector relation of the line voltage, the voltage impressed on the condenser, and the voltage impressed on the inductance in the auxiliary phase.
Figure 6:
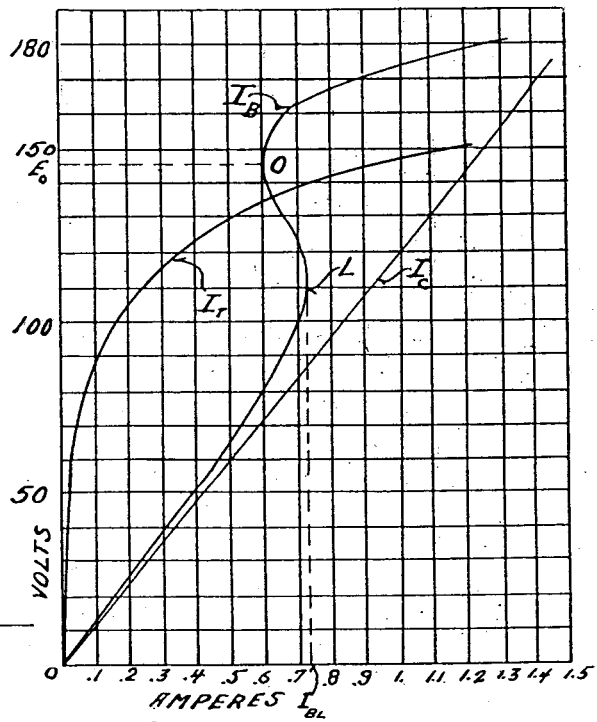
Figure 6 is a view showing a series of curves indicating the relation between current and voltage taken by a condenser and a parallel connected inductance. It shows that within a certain range an increase in voltage follows a decrease in current.

A further form of the invention is shown in Figure 4 in which the auxiliary phase $B_4$ is provided with the additional turns 17 which at starting is connected through the choke 18 and the condenser 19, such choke and condenser being in series. The movable member 20 of the automatic switch moves in the manner indicated in Figure 4 under running condition to cut out the auxiliary turns 17 and to connect the choke 21 in parallel with the condenser 19. The chokes 18 and 21 may be separate or may be wound on the same core, the latter form being shown in Figure 4. It is obvious that the same number of turns could be employed in the $B_4$ phase even at starting, provided a different design of choke 18 were then used.

It is believed that a reference to Figures 8 and 9 at this point will more clearly illustrate the performance of the apparatus. The vector diagram, Figure 8, shows the manner in which the voltage on the condenser $E_C$ is raised for any given line voltage $E$ by the vector relation of the voltage $E_L$ across the inductance and $E_C$ across the condenser when the condenser and inductance are connected in series.

In the diagram shown in Figure 9, which shows the operating characteristics of the motor, a rather peculiar current characteristic results. These curves are plotted for a condenser connected in parallel with the reactance or choke and show the relation of the following currents at the different voltages:

$I_B$ = the total current taken from the mains with the condenser connected in parallel with the choke.

$I_T$ = the current taken by the choke alone.
$I_C$ = the current taken by the condenser.
$E$ = the line voltage.

Starting with a low voltage E impressed across the circuit and gradually increasing it, one finds that the current $I_B$ increases with increasing voltage at first until the choke is near saturation, that is, near the knee of the saturation curve $I_T$. From here on an increase in voltage will result in a decrease in current $I_B$ until at a still higher voltage E the current again increases. This dip in the volt-ampere curve is very important, can always be demonstrated, and can be shifted by various changes in the design of the choke or of the joint circuit including the choke and condenser.

The peculiarity of this curve is that the current $I_B$ increases to the point L as the voltage on the condenser is increased, and from this point to the point O further voltage increase causes a decrease in the current $I_B$. However, from the latter point on the current $I_B$ again increases.

In my prior Patent No. 1,908,522 of May 9, 1933, for an Electric motor, a single phase condenser motor was shown in which the effective condenser capacity was automatically cut down by voltage rise on the transformer or choke, part of the condenser current being thus neutralized by the increased magnetizing current of the choke or transformer. However, part of the condenser current is ineffective at starting as the choke or transformer is worked near the knee of the magnetizing curve. This loss of effective condenser current can be avoided by either disconnecting the choke at starting and only reconnecting it in parallel with the condenser when the motor comes up to speed, thus getting the full benefit of the neutralizing effect of the choke from no load to maximum load. The effect of the condenser at starting can be increased by connecting it in series with the choke at starting, thus raising the voltage on the condenser and thereby securing the benefits hereinabove enumerated, and in addition securing the additional condenser effect due to the higher voltage impressed on the condenser.

It is apparent that the switching over can occur at any point desired so that a new set of characteristics are obtained which are more desirable for the running condition of the motor. These curves, however, have been shown to illustrate clearly the action of the choke and condenser when connected in the auxiliary phase in the manner described.

It is also apparent that the set of curves obtained under running conditions will be similar to those hereinabove described, but will have different values. Therefore, it is clear that with this invention two distinctly different sets of characteristics may be most easily obtained, each set of characteristics producing the most effective motor for that particular portion of its work, namely, the starting characteristics may be made highly effective for giving a large starting torque. The running characteristics may be made equally effective for producing an efficient running motor.

It is to be understood that the expression "low voltage condenser" does not necessarily mean merely a low voltage condenser but is to be interpreted either with this meaning or as meaning a high voltage condenser connected across the high voltage circuit of a step-up transformer. The low voltage leads of the transformer are then the effective low voltage condenser leads. The whole unit is thus equivalent to a low voltage high capacity condenser.

It will be seen that this invention provides a novel form of split phase motor which is economical to make, which is automatic in its operation, and which has a high efficiency as well as a high starting torque.

It will be seen further that the device may be made relatively cheaply and that it is of a simple and eminently practical construction.

Although this invention has been described in considerable detail, it is to be understood that such description is intended as illustrative rather than limiting, as the invention may be variously embodied and is to be interpreted as claimed.

I claim:

1. A single-phase alternating current motor having a main winding and an auxiliary winding and a rotor, a pair of condensers and a pair of inductances, and automatic switching means for first connecting two circuits in parallel with each other and in series with the auxiliary winding during starting, each parallel circuit consisting of a condenser and an inductance, and for subsequently connecting said condensers in series with each other and each in parallel with its corresponding inductance when the motor attains speed.

2. A single-phase alternating current motor having a main winding and an auxiliary winding and a rotor, a pair of condensers and a pair of inductances, automatic switching means for first connecting two circuits in parallel with each other and in series with the auxiliary winding during starting, each parallel circuit consisting of a condenser and an inductance, and for subsequently connecting said condensers in series with each other and each in parallel with its corresponding inductance when the motor attains speed, and means for raising the voltage on said condensers during starting.

3. A single-phase alternating current motor having a main winding and an auxiliary winding, an auxiliary circuit connected in series with said auxiliary winding, said auxiliary circuit including a condenser and induction producing means, and automatic switching means for forming a series connection in said auxiliary circuit of said condenser and said induction producing means during the starting of said motor, and for forming a parallel connection of said induction producing means and said condenser in said auxiliary circuit during the running of said motor.

4. A single-phase alternating current motor having a main winding and an auxiliary winding, an auxiliary circuit connected in series with said auxiliary winding, said auxiliary circuit including a condenser and induction producing means, automatic switching means for forming a series connection in said auxiliary circuit of said condenser and said induction producing means during the starting of said motor, and for forming a parallel connection of said induction producing means and said condenser in said auxiliary circuit during the running of said motor, and means for raising the voltage on said condenser during the starting of said motor.

5. A single-phase alternating current motor having a main winding and an auxiliary winding, an auxiliary circuit connected in series with said auxiliary winding, said auxiliary circuit including a condenser and induction producing means, automatic switching means for forming a series connection in said auxiliary circuit of said condenser and said induction producing means during the starting of said motor, and for forming a parallel connection of said induction producing means and said condenser in said auxiliary circuit during the running of said motor, means for raising the voltage on said condenser during the starting of said motor, and an additional distributed winding associated with said auxiliary winding.

6. A single-phase alternating current motor having a main winding and an auxiliary winding, an auxiliary circuit connected in series with said auxiliary winding, said auxiliary circuit including apparatus for producing a leading current and a reactor, said auxiliary winding having an additional distributed winding associated therewith, and automatic switching means for cutting out the voltage raising effect of said reactor and for cutting out the additional distributed winding when said motor attains speed.

7. A single-phase alternating current motor having a main winding and an auxiliary winding and a rotor, condenser means and inductance means, and automatic switching means for first connecting the condenser means and inductance means in series and in the circuit of the auxiliary winding for producing maximum condenser effect during starting and for subsequently connecting the inductance means and condenser means in parallel after a predetermined running speed has been attained, said inductance means and condenser means constituting a unit and said unit being connected in series with the circuit of the auxiliary winding.

8. A single-phase alternating current motor having a main winding and an auxiliary winding and a rotor, condenser means and inductance means, and automatic switching means for first connecting the condenser means and inductance means in series and in the circuit of the auxiliary winding for producing maximum condenser effect during starting and for subsequently connecting the inductance means and condenser means in parallel after a predetermined running speed has been attained, said inductance means and condenser means constituting a unit and said unit being connected in series with the circuit of the auxiliary winding, and said unit being so designed that the parallel connection of inductance means and condenser means will allow an increase in current through said auxiliary winding with a decrease in running speed.

FRANK J. LYDEN.